United States Patent [19]

Anthony et al.

[11] 4,282,621

[45] Aug. 11, 1981

[54] RELEASABLE LOCKING DEVICE

[75] Inventors: Charles Anthony, Milwaukee; Charles A. Portz, Wauwatosa, both of Wis.

[73] Assignee: Rite-Hite Corporation, Cudahy, Wis.

[21] Appl. No.: 967,899

[22] Filed: Dec. 11, 1978

[51] Int. Cl.³ .............................................. E01D 1/00
[52] U.S. Cl. .................................... 14/71.1; 280/186; 280/504
[58] Field of Search ...................... 14/71.3, 71.1, 72.5; 280/186, 504, 505; 404/110; 172/275

[56] References Cited

U.S. PATENT DOCUMENTS

| | | | |
|---|---|---|---|
| 2,266,789 | 12/1941 | Norbom | 14/71.1 X |
| 2,954,241 | 9/1960 | Warren | 404/110 X |
| 3,735,440 | 5/1973 | Hetmanski | 14/71.1 |
| 4,127,856 | 11/1978 | Bickel | 14/71.1 X |
| 4,194,854 | 3/1980 | Mauldin | 404/110 |

*Primary Examiner*—Nile C. Byers, Jr.
*Attorney, Agent, or Firm*—Neuman, Williams, Anderson & Olson

[57] ABSTRACT

A device is provided for releasably securing a parked vehicle to an adjacent structure. The device is provided with a first member hingedly mounted for movement between an operative mode and an inoperative mode. When the first member is in an operative mode the distal end thereof will releasably engage a portion of the parked vehicle and retain same in a desired position relative to the adjacent structure. When the first member is in an inoperative mode, it assumes a vehicle-release position. The first member is provided with means for moving same from the inoperative mode to the operative mode. A further means is provided for automatically locking the first member in an operative mode. The further means includes a means for effecting controlled unlocking of the first member whereby the latter will automatically return to its inoperative mode. The first member and associated means are mounted so as to move as a unit in a substantially vertical direction to compensate for dimensional variations occurring in the various vehicles parked next to the adjacent structure.

15 Claims, 15 Drawing Figures

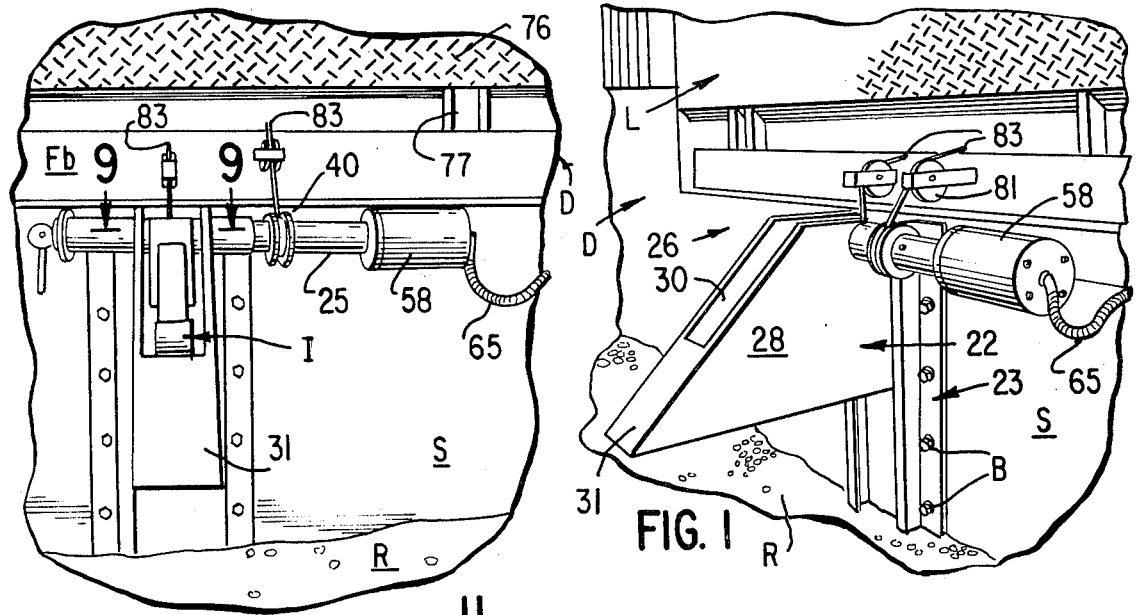
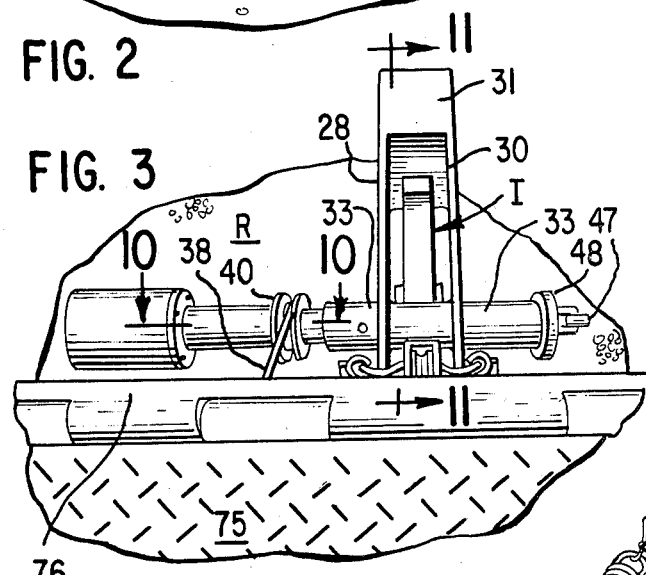
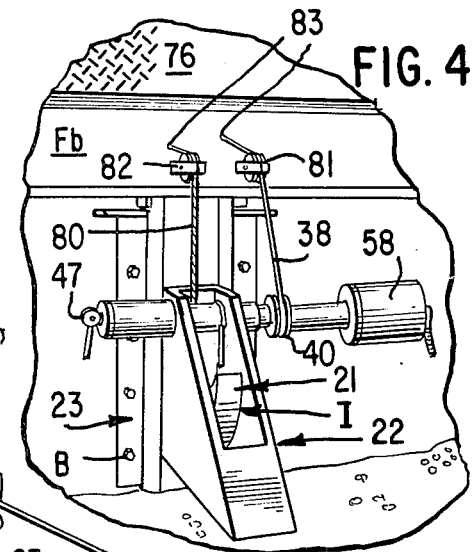
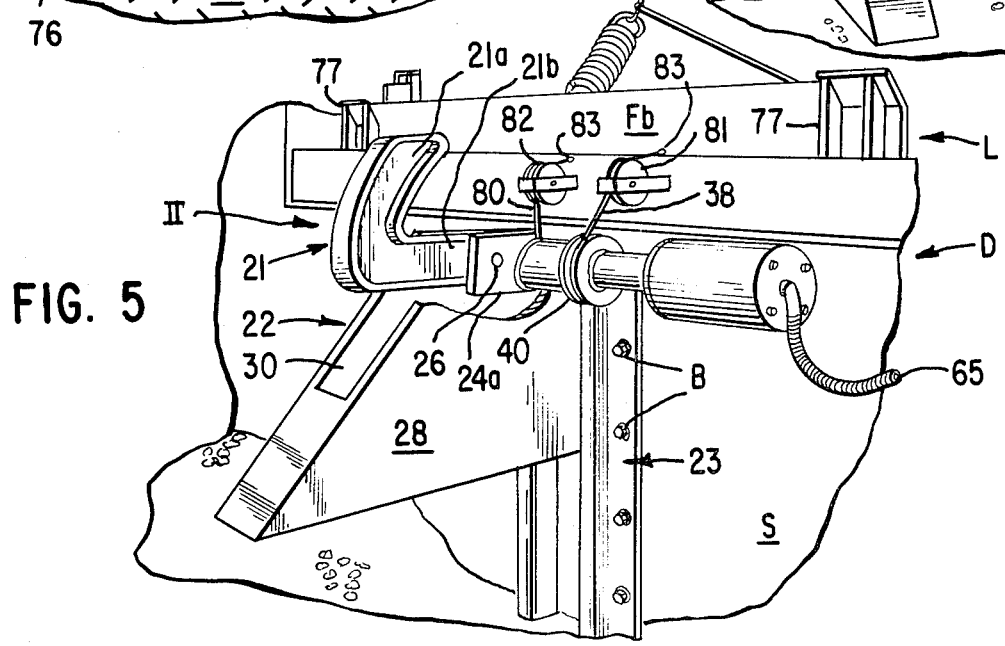

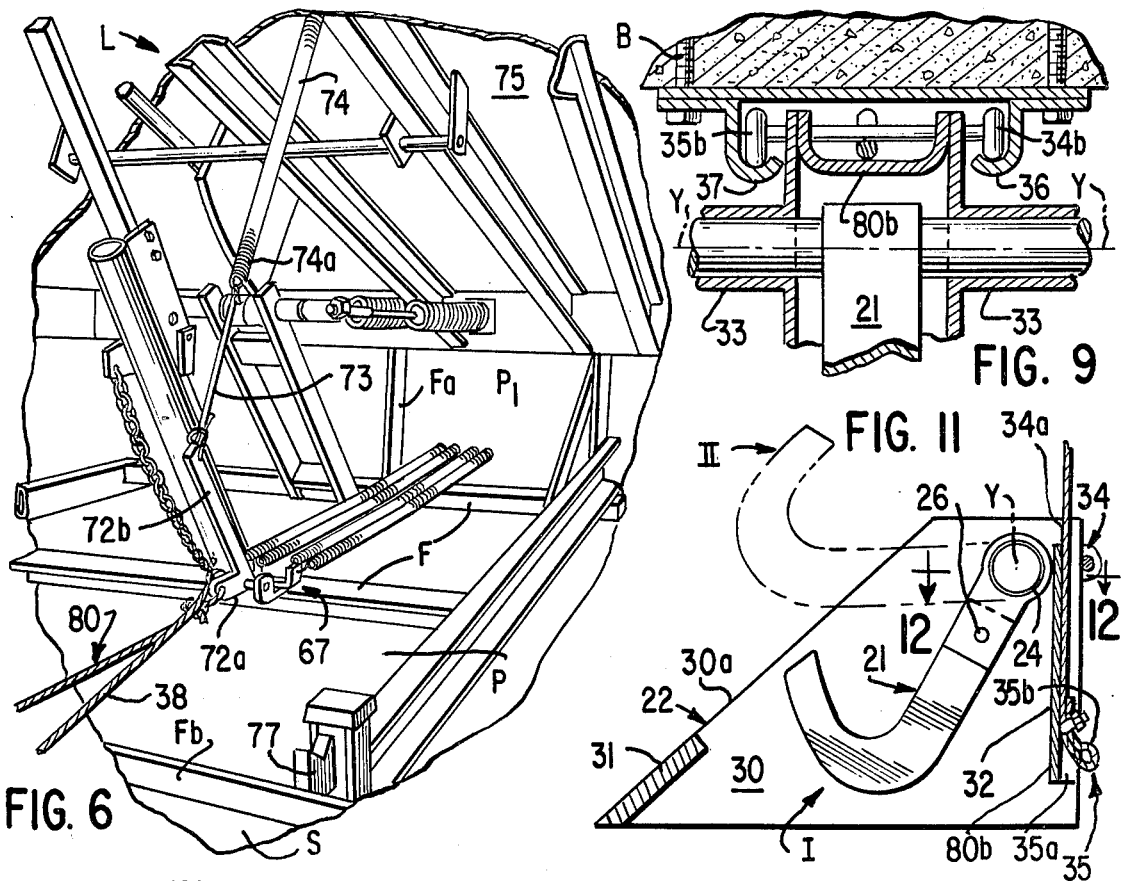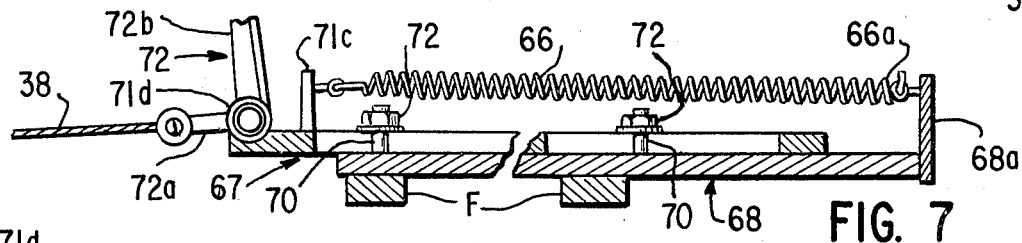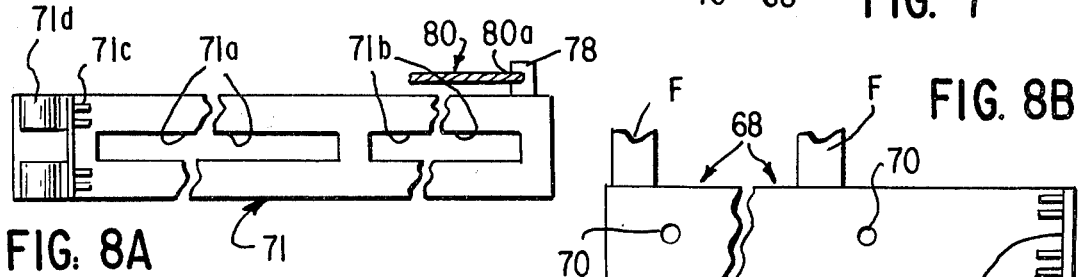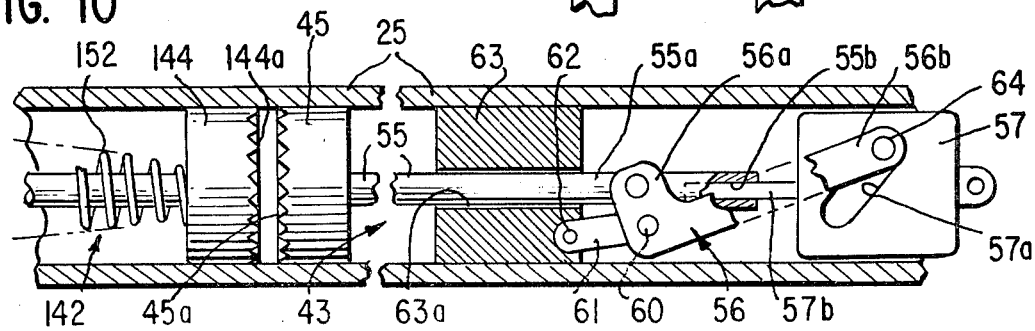

RELEASABLE LOCKING DEVICE

BACKGROUND OF THE INVENTION

Prior to loading and/or unloading of trucks or truck trailers it is important from a safety standpoint that the vehicle be properly secured in a parked position next to the loading dock or platform. In this regard, it is important that the driver of the vehicle be aware of the fact that the vehicle is secured in a parked position and, thus, avoid the possibility of an inadvertent attempt being made to move the vehicle away from the dock or platform while it is secured thereto.

Various locking mechanisms and devices for this general purpose have heretofore been provided; however, because of certain design features they are beset with one or more of the following shortcomings: (a) they are unstable and incapable of withstanding the stresses and strains normally encountered when utilizing such equipment; (b) the various components thereof are exposed and highly susceptible to being damaged due to vandalism or by the vehicle when the latter is being maneuvered into its parked position; (c) because of the exposure of various components their operation may be deleteriously affected by adverse climatic conditions; (d) they are incapable of accommodating vehicles, the physical dimensions of which may vary over a wide range; (e) the location of the mechanism or device at the loading dock or platform interferes with the normal operation of lift trucks, or the like, utilized during the loading and/or unloading operations; (f) the mechanism or device is bulky and awkward to manipulate and cannot be effectively operated from a remote location; (e) the mechanism or device requires substantial modifications to be made to the dock or platform in order to properly install the mechanism or device on the dock or platform; and (f) the mechanism or device is not readily capable of being connected to a dock leveler apparatus incorporated in the dock so that the operation of the mechanism or device cannot be readily coordinated with that of the dock leveler.

SUMMARY OF THE INVENTION

Thus, it is an object of the invention to provide a device of the type described which avoids all of the aforenoted shortcomings.

It is a further object of the invention to provide a device of the type described which is of simple, compact design, is effective and versatile in operation; and may be readily installed on existing docks or platforms.

It is a still further object of the invention to provide a device which may be readily utilized alone or in combination with various types of dock leveling equipment.

Further and additional objects will appear from the description, accompanying drawings and appended claims.

In accordance with one embodiment of the invention, a device is provided for releasably securing a parked vehicle to an adjacent structure such as a loading dock or platform. The device includes a hook-like member which is hingedly mounted for movement between operative and inoperative modes. When in an operative mode, the hook-like member lockingly engages the parked vehicle and restrains movement of the vehicle away from the adjacent structure. When in an inoperative mode, the hook-like member is disengaged from the vehicle and the latter is free to move away from the adjacent structure. A means is provided which automatically locks the hook-like member in its operative mode. The means is provided with a mechanism for the controlled release thereof whereby the hook-like member will automatically assume an inoperative mode. The hook-like member and the locking means therefor are mounted so that they are capable of moving as a unit in a substantially vertical direction whereby the hook-like member can lockingly accommodate vehicles which vary in size and shape over a wide range and will compensate for vertical movement of the vehicle while being loaded.

DESCRIPTION

For a more complete understanding of the invention, reference should be made to the drawings wherein:

FIG. 1 is a fragmentary perspective front view of one form of the improved device shown mounted on the front wall of a loading dock and with the hook-like member shown in an inoperative mode within a carriage and the latter in its normal upwardly biased position.

FIG. 2 is a fragmentary front elevational view of the device of FIG. 1.

FIG. 3 is a fragmentary top plan view of the device of FIG. 1.

FIG. 4 is a fragmentary perspective front view similar to FIG. 1 but showing the carriage and the various components associated therewith vertically depressed relative to the normal upwardly biased position shown in FIG. 1.

FIG. 5 is a fragmentary enlarged perspective front view similar to FIG. 1 but having a portion of the carriage removed so as to expose the hook-like member in an operative mode.

FIG. 6 is a fragmentary perspective front view of a dock leveler with the deck member thereof in an upwardly pivoted position and with certain components of the device of FIG. 1 shown connected to the dock leveler whereby upward pivoting of the deck member will cause the hook-like member to assume its operative mode.

FIG. 7 is an enlarged fragmentary vertical sectional view of an assembly for biasing the carriage to normally assume the position shown in FIG. 1. FIGS. 8A and 8B are fragmentary top plan views of the various components comprising the assembly of FIG. 7.

FIG. 9 is a fragmentary enlarged sectional view taken along line 9—9 of FIG. 2.

FIG. 10 is a fragmentary enlarged sectional view taken along line 10—10 of FIG. 3.

FIG. 11 is a fragmentary sectional view taken along line 11—11 of FIG. 3.

Figure 14:
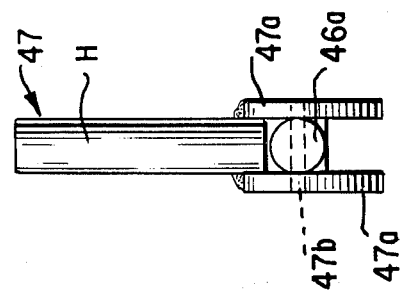
FIG. 14 is an end view of the cam lever shown in FIG. 12.

Referring now to the drawings, a device 20 is shown which is adapted to releasably secure a parked vehicle (not shown) to a loading dock D or the like. The loading dock in the illustrated embodiment is provided with an exposed vertical surface S on which the device 20 is mounted. Disposed above the device 20 and forming a part of the dock D is a dock leveler L which is installed within a pit P formed in the dock itself, see FIG. 6. The leveler L may be of a type disclosed in U.S. Pat. No. 4,110,860, issued Sept. 5, 1978. Various structural components of the leveler which are associated with the device 20 will be described more fully hereinafter.

Device 20, as seen more clearly in FIGS. 1-5, includes a hook-like member 21 which is hingedly mounted on a carriage 22, the latter being adapted to move in a vertical direction relative to a guide unit 23. The unit 23 is secured to the dock surface S by suitable anchor bolts B or the like.

The hook-like member 21 is adapted to pivot between its normal inoperative mode I, see FIGS. 2-4, and an operative mode II, see FIG. 5. When member 21 is in an operative mode II, the distal upwardly extending end 21a thereof is adapted to engage behind a rear bumper (sometimes referred to as an IC section), required to be located on the underside of the bed of the parked vehicle, not shown, which is to be loaded or unloaded at the dock D.

Pursuant to Federal Motor Carrier Safety Regulations, trucks and truck trailers under its jurisdiction are required to be equipped with rear bumpers if the underside of the bed of the truck or trailer, when empty, is 30 inches or more above the roadway R. The bumper is normally provided with a pair of depending, spaced, substantially parallel arms which have the lower ends thereof connected by a transversely extending crosspiece. The regulations recite that (a) the arms or ends of the crosspiece shall not be set in more than 18 inches from the corresponding side edges of the bed; (b) the bumper shall not be recessed more than 24 inches from the rear edge of the bed; and (c) the crosspiece shall not be disposed more than 30 inches above the roadway when the bed is empty. It is this rear bumper which the hook-like member 21 is intended to engage; however, it is to be understood of course that the device is not intended to be so limited.

The hook-like member 21 in the illustrated embodiment has a substantially J-shaped with the longer leg 21b thereof accommodated in a bifurcated bracket 24. The bracket 24, as seen more clearly in FIG. 12 encompasses a hollow shaft 25 which forms the hinge axis Y—Y for member 21. The bracket 24 has a pair of radially extending arms 24a, 24b between which the leg 21b is interposed. The leg is connected to the arms by a shear pin 26 which extends transversely between the bracket arms 24a, 24b and the leg 21b. The bracket 24 is secured to shaft 25 by a locking or set screw 27, see FIG. 12. Thus, hook-like member 21, bracket 24, and shaft 25 pivot as a unit about the hinge axis Y—Y.

The carriage 22 in the illustrated embodiment includes a pair of spaced parallel plates 28, 30 which protrude outwardly a substantial distance from the exposed surface S of the dock D. The bracket 24 and the hook-like member 21 are disposed between the plates. The plates are of like configuration and each has a substantial portion 28a, 30a of the upper edge thereof sloping upwardly and rearwardly so as to form a cam surface which is adapted to be engaged by the crosspiece of the vehicle rear bumper when the vehicle is being backed into a parked position with respect to the loading dock D. The plates 28, 30 are maintained in spaced parallel relation by an outer spacer segment 31, see FIG. 1, and an inner spacer segment 32, see FIGS. 9, 11, 12.

Each plate 28, 30 is provided with a sleeve bearing 33 which is coaxially aligned with the hinge axis of the hook-like member 21 and extends laterally away from the member 21.

Carried on the rear edge portion of carriage 22 is a pair of vertically spaced roller units 34, 35. Each roller unit is of like construction and includes an elongated shaft 34a, 35a which is fixedly secured to the rear edge portion of the plates 28, 30 and the inner spacer segment 32. The ends of the shaft extend outwardly from the exposed surfaces of the plates 28, 30 and have rotatably mounted thereon wheels 34b, 35b. Corresponding wheels of the units 34, 35 are disposed within elongated vertically extending tracks 36, 37, see FIG. 12. The tracks are horizontally spaced from one another and form components of guide unit 23. Thus, by reason of the roller units 34, 35, the carriage 22, hook-like member 21 and associated mechanism are capable of being moved as a unit in a vertical direction relative to the guide unit 23.

Figure 12:
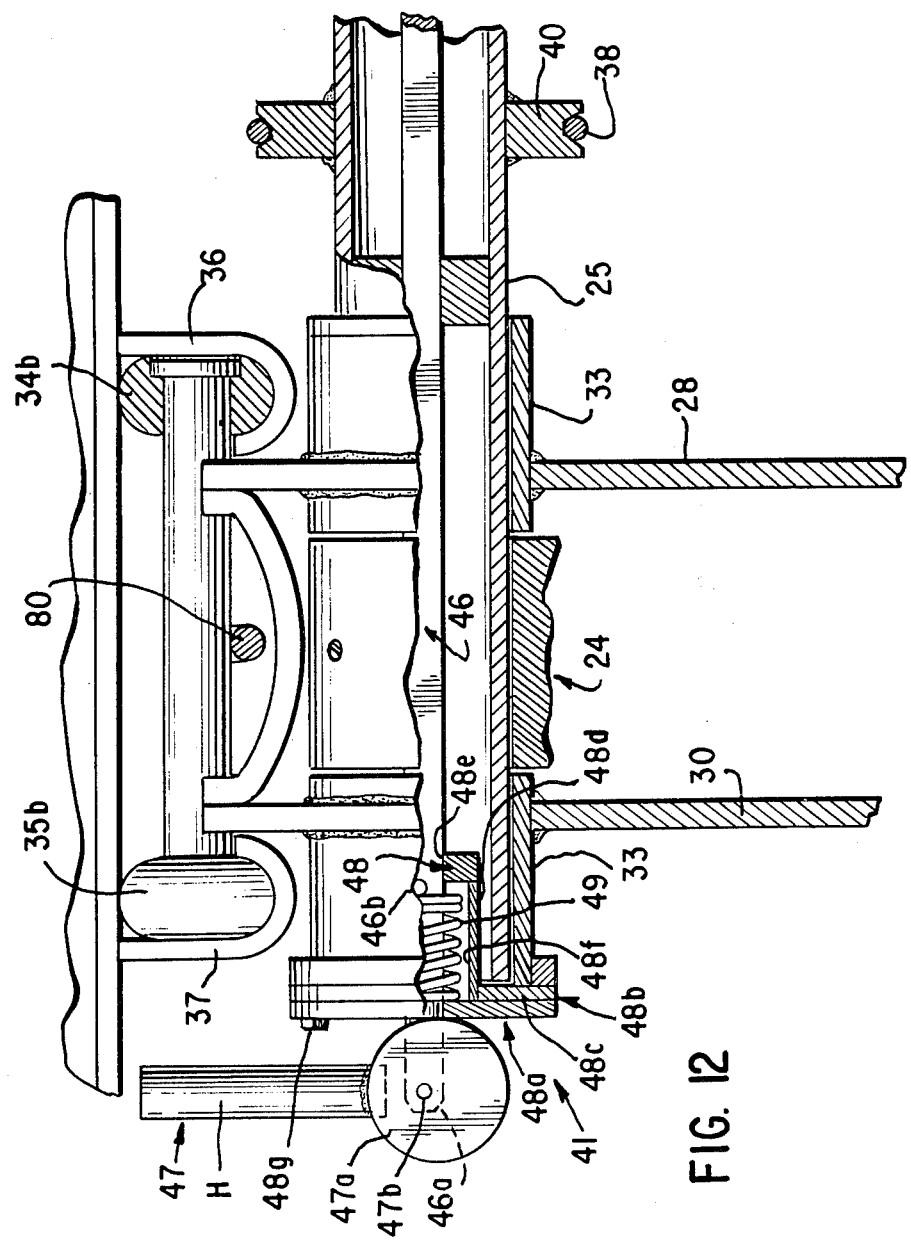
FIG. 12 is a fragmentary enlarged sectional view taken along line 12—12 of FIG. 11.

Hook-like member 21 is pivoted relative to the carriage bearings 33 from an inoperative mode I to an operative mode II by a cable 38 which encompasses a pulley 40, the latter being affixed to the exterior of a portion of the shaft 25 which projects axially outwardly from one of the carriage bearings 33, see FIG. 12.

The hook-like member 21 is automatically retained in its operative mode II by a locking assembly 41 which is carried by the shaft 25 and in turn by the carriage as well. Assembly 41 includes a pair of sections 42, 43 which are substantially disposed within the hollow shaft 25 of member 21. The sections 42, 43 are provided with complemental disc-shaped endpieces 44, 45 which are biased to normally assume an abutting relation with one another. The abutting surfaces 44a, 45a of the pieces are provided with serrations which, when the pieces are in abutting relation, prevent relative rotational movement in one direction between the pieces and, thus, prevent the hook-like member 21 returning to its inoperative mode I.

Affixed to endpiece 44 and extending axially therefrom away from endpiece 45 is an elongated rod 46, preferably having a noncircular (e.g., square) cross-sectional configuration. The rod is axially centered within hollow shaft 25 and has the opposite end 46a thereof exposed and projecting beyond sleeve bearing 33. Carried on the rod exposed end 46a is a cam lever 47 which is shown more clearly in FIGS. 12, 14. The lever includes a pair of disc-shaped pieces 47a which are disposed on opposite sides of rod end 46a and are pivotally connected thereto by pin 47b. The pivotal axis defined by pin 47b is offset relative to the centers of pieces 47a. Affixed to the peripheries of the pieces 47a and extending radially outwardly therefrom is a handle H which permits manual manipulation of the lever 47 when it is desired to manually release the endpieces 44, 45 from their normal abutting interlocking relation.

The peripheries of the cam pieces 47a are in rolling contact with the exposed surface of a cap section 48a which forms a component of a bushing 48. Bushing 48, as seen in FIG. 12, includes a second section 48b having a collar 48c affixed to the end of sleeve bearing 33. Affixed to and extending from collar 48c into hollow shaft 25 is a cylindrical segment 48d through which the rod 46 slidably extends. The inner end of segment 48d is provided with an opening 48e which conforms substantially to the cross-sectional configuration of rod 46 and provides sliding support for the rod.

Bearing segment 48d is provided with an elongated pocket 48f which extends axially from collar 48c. Disposed within pocket 48f is a coil spring 49 having one end thereof resiliently engaging a stop pin 46b carried by rod 46. The opposite end of the spring 49 resiliently engages the cap section 48a when the latter is assembled with collar 48c by a plurality of fasteners 48g, only one being shown in FIG. 12. Thus, spring 49 urges the rod 46 through stop pin 46b in a direction towards the endpiece 45 of section 43.

Figure 13:
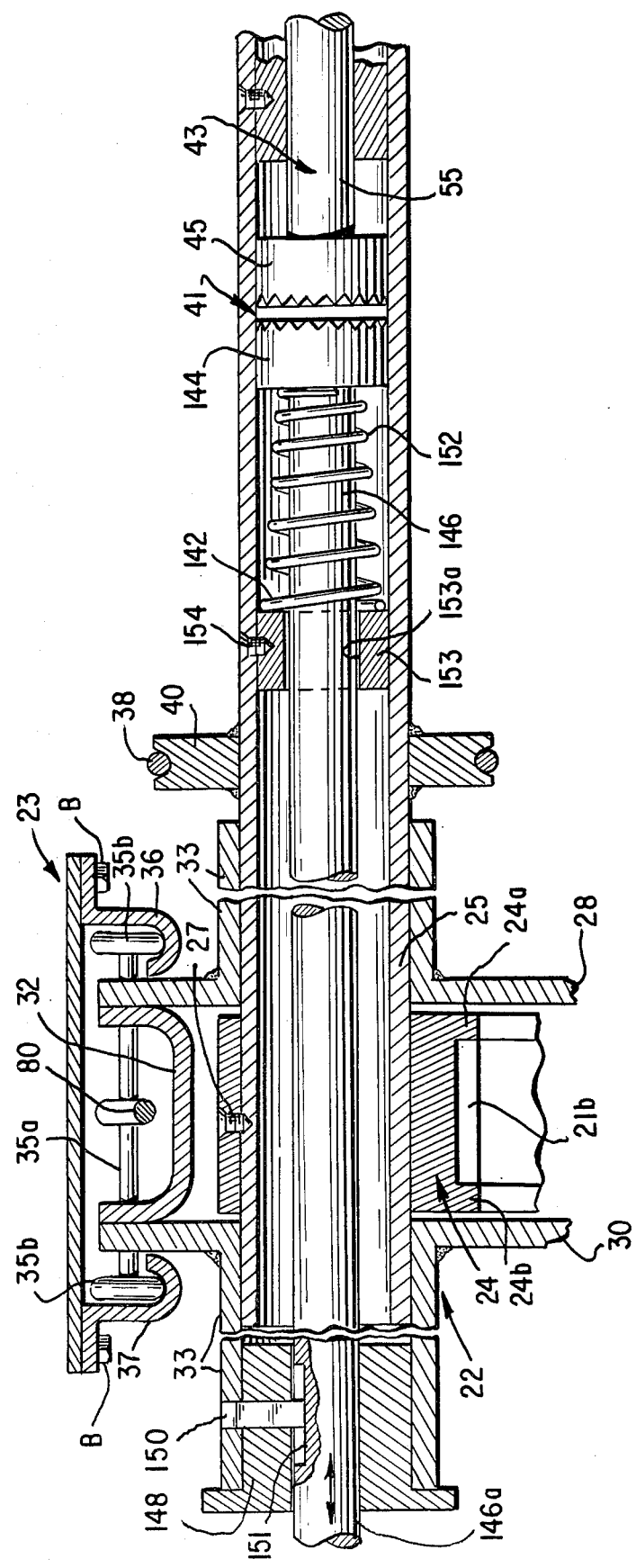
FIG. 13 is similar to FIG. 12 but showing a modified form of construction.

A modified section 142 is shown in FIG. 13 wherein a rod 146 having a circular cross-sectional configuration is substituted for rod 46 having the non-circular cross-sectional configuration.

Rod 146 and endpiece 144 are held against rotating with the hook-like member 21 by a key 150 which extends radially inwardly through the bearing 33 of the carriage 22 and a bushing 148 and terminates within a keyway 151 formed in the portion of rod 146 aligned with the bushing 148. Bushing 148 fits snugly within the end of bearing 33. By reason of the key 150 and keyway 151 the rod 146 can only be moved axially relative to the sleeve bearing 33 and bushing 148.

Rod 146 and endpiece 144 are biased towards piece 45 by a coil spring 152 which encompasses rod 146 and has one end thereof resiliently engaging endpiece 144 and the other end resiliently engaging a collar 153 which is spaced longitudinally from piece 144. Collar 153 is affixed to the interior of shaft 25 by a threaded fastener 154. The bore 153a formed in the collar is sized so that the collar and shaft can rotate independently of the rod 146 and yet the rod can be moved independently longitudinally of the collar and shaft when the endpiece 144 is to be manually released from endpiece 45. Rod 146 can be manually moved longitudinally by a cam lever 47 of the type previously described and shown in FIGS. 12, 14.

Section 43 of the locking assembly 41 includes an elongated rod 55 having one end thereof affixed to endpiece 45 and extending axially therefrom away from endpiece 44 or 144. Rod 55 preferably has a noncircular cross-sectional configuration for reasons to be discussed more fully hereinafter and is disposed coaxially with the hinge axis Y—Y of shaft 25. The free end portion 55a of rod 55, as seen in FIG. 10, is connected to the short arm 56a of a bell-crank lever 56. The second or longer arm 56b of the bell crank lever is slidably connected to a slide block 57 which is disposed within the end of shaft 25 and is mounted for longitudinal movement therein. Movement of block 57 is controlled by a solenoid or the like, not shown, which is disposed within a housing 58 affixed to and extending endwise from shaft 25. The housing 58 and shaft 25 rotate as a unit about the hinge axis Y—Y when the hook-like member 21 moves between modes I and II. When the solenoid is energized it will cause endpiece 45 to become disengaged from endpiece 44 or 144 thereby enabling the member 21 to move from the operative mode II to its normal inoperative mode I. Force of gravity causes the member 21 to automatically return to the inoperative mode I.

It will be noted in FIG. 10 that bell crank lever 56 is pivotally connected at 60 to one end of a fulcrum link 61. The other end of the link is pivotally connected at 62 to a guide member 63 which is fixedly located within shaft 25. Member 63 is provided with a noncircular bore 63a which corresponds substantially to the exterior configuration of rod 55. Thus, by reason of the shape of the member bore 63a, shaft 25, member 63 and rod 55 will rotate as a unit about hinge axis Y—Y. The member bore 63a; however, enables the rod 55 to move longitudinally (axially) independently of guide member 63 and shaft 25.

As seen in FIG. 10, slide block 57 is provided on opposing sides thereof with a pair of like substantially diagonally extending (upwardly sloping) slots 57a in each of which the end of arm 56b is caused to move by a pin 64. The pin 64 is carried by the lever arm 56b and is sized so as to slide only in directions longitudinally of the slot. Thus, the slot 57a in combination with the bell crank lever 56 will provide a substantial mechanical advantage (e.g., 7 to 1) so that a five pound pull exerted on block 57 by the solenoid will effect a thirty-five pound pull on endpiece 45 and cause the latter to separate from endpiece 44 or 144.

To provide support and also serve to guide the end portion 55a of rod 55, an axially aligned stud 57b is provided which is affixed to block 57 and projects therefrom towards endpiece 55. The distal end of the stud terminates within an axial bore 55b formed in the end portion 55a of rod 55. The length of the bore 55b and the extent to which the distal end of stud 57b projects into the bore is such that the rod 55 and block 57 can move relative to one another without causing the stud to become disengaged from bore 55b.

As seen in FIGS. 1, 2 and 5, the solenoid which is disposed within housing 58 is energized electrically through flexible wiring 65 and, thus, is capable of twisting sufficiently without difficulty so as not to impede pivoting of the housing 58 and the hook-like member 21 between modes I and II of the latter. Wiring 65 is connected to suitable controls and a power source, not shown, which may be remotely located from the immediate loading dock or platform. Such controls and power source are preferably located so that they can be secured and are not accessible from the outside when the device 20 is not in use. By having the controls and power source so located and the solenoid, block 57 and associated components disposed within the housing 58 and within the hollow shaft 25, vandalism of the device is discouraged and the susceptibility of the device to being deleteriously affected by adverse weather conditions is substantially diminished.

As aforementioned, the carriage 22 is mounted on guide unit 23 for movement relative thereto in a substantially vertical direction and is biased to normally assume an up, or rest, position U, as seen in FIG. 1. In the illustrated embodiment, the bias is obtained through a plurality of heavy duty coil springs 66 carried by an assembly 67 which is supported by certain frame components F of the dock leveler L shown in FIGS. 6, 7.

The assembly 67, as seen more clearly in FIGS. 7, 8A, 8B, includes an elongated stationary section 68 which spans the distance between frame components F and is secured thereto by welding or other suitable means. The longitudinal axis of section 68 is substantially perpendicular to the hinge axis Y—Y of hook-like member 21. Disposed in longitudinally spaced relation on section 68 are a pair of upright guide bolts 70. The end of section 68 furthest removed from dock surface S is provided with an upright flange 68a to which corresponding ends 66a of springs 66 are connected.

Assembly 67 also includes an elongated second section 71 which overlies section 68 and is slidable relative thereto in a longitudinal direction. Section 71, as seen in FIGS. 7, 8A, is provided with a pair of spaced, yet aligned, longitudinally extending slots 71a, 71b through which extend corresponding bolts 70 carried on section 68. The width of the slots are sized relative to the diameter of the bolt shanks so that only longitudinal movement of section 71 relative to section 68 will occur. The sections are retained in assembled relation by nut and washer combinations 72 which are threaded onto the upper ends of the bolts 70.

At the end portion of section 71, which is disposed closest to the dock surface S, there is provided an upstanding flange 71c to which the opposite ends of the coil springs 66 are connected. In the illustrated embodiment, two sets of coil springs 66 are utilized; one set being disposed to one side of the guide bolts 70 and the second set being disposed on to the opposite side of the bolts. If desired, greater or lesser numbers of springs may be utilized and will depend upon the amount of biasing force desired. Whatever the number of springs utilized they should be arranged so that the force thereof will not cause the section 71 to seek an askewed position relative to section 68 and, thus, increase friction wear between the bolts and slots.

Disposed forwardly of the flange 71c, that is to say, closer to dock surface S, and affixed to the end portion of section 71 is a bearing 71d to accommodate a second bell crank lever 72. The short leg 72a of the lever has connected thereto one end of cable 38. The opposite end of cable 38 is connected to and encompasses the pulley 40 which is affixed to the exterior of hollow shaft 25, see FIG. 5. The longer leg 72b of lever 72 has the upper end thereof connected to a cable 73, which in turn is connected to the end 74a of a coil spring 74, attached to and depending from the underside of a pivotally mounted deck member 75.

The deck member 75 comprises one of the basic components of the dock leveler L and is hinged to an upright rear frame section Fa of the leveler which is anchored to the adjacent vertical back surface $P_1$ of the pit P formed in the loading dock. The deck member 75 normally assumes a horizontal rest position wherein the exposed top surface thereof is coplanar with the loading surface of the dock disposed adjacent the pit.

Hingedly attached to the outwardly disposed edge of the deck member 75 is an elongated extension plate 76, see FIG. 3. When the deck member 75 is in its rest position, the extension plate will normally assume a depending vertical position and have the lower edge thereof engaging upright keepers 77 which are mounted on a front section Fb of the leveler frame.

When the deck member 75 and associated extension plate 76 are manipulated to an operative position so as to accommodate the bed of the parked vehicle, the deck member 75 is pivoted initially upwardly to its fullest extent so that the depending extension plate will clear the vehicle bed. Once the deck member has reached its fully raised position, the extension plate will swing outwardly whereby, when the deck member 75 and the extended extension plate 76 move downwardly to the operative position, the extension plate will bridge the gap which exists between the end of the vehicle bed and the dock surface S.

Manipulation of the deck member and extension plate to the operative position occurs only after the vehicle has assumed its parked position next to the loading dock. Because of the cable 73 and spring 74, the long leg 72b of the lever 72 will pivot in a clockwise direction about bearing 71d as an axis (see FIG. 7) when the deck member 75 moves from its rest position to its raised position (FIG. 6). Due to the length differential between legs 72a, 72b, lever 72 has a substantial mechanical advantage (e.g., 12 to 1) and, thus, a substantial turning force is imparted to the shaft pulley 40 through cable 38 and raises the hook-like member 21 to its operative mode II.

As seen in FIG. 8A, section 71 is provided with a laterally extending lug 78 which is disposed adjacent the end of the section opposite the bearing 71d. Attached to the lug is one end 80a of a cable 80. The opposite end 80b of the cable is secured to the lowermost roller unit 35 mounted at the rear of carriage 22. Thus, springs 66 urge section 71 to slide rearwardly relative section 68 and away from the carriage 22 and, thus, cause an upward force to be exerted on the carriage.

As will be noted in FIGS. 1 and 4, both cables 38, 80 engage idler pulleys 81, 82, respectively, which are mounted on frame section Fb. Suitable openings or slots 83 are provided in frame section Fb to permit the cables to pass therethrough. Where slots 83 are formed in the frame section, the axes of the pulleys are mounted behind the frame section Fb thereby reducing the exposure of the pulleys to being engaged by the end of the vehicle. As seen in FIGS. 1 and 2, the pulleys are mounted on inverted U-shaped brackets 84 which project outwardly from frame section Fb and are positioned a substantial distance above guide unit 23 and the shaft 25. The pulley in each instance is disposed between the legs of the bracket and behind the bail portion which interconnects the outer ends of the legs. The relative location of the pulleys may vary as desired and will be governed to a large extent by the physical characteristics of the loading dock or platform.

The locking device has heretofore been described in relation to a truck or truck trailer and a loading dock or platform. It should be noted, however, that the device is not intended to be limited thereto, but in certain instances may be utilized in a marine dock facility for securing boats or barges thereto.

If desired, visual or audio signal means may be incorporated with the device. Such signal means may be triggered by the hinge movement of the member 21 and associated shaft 25. A suitable lug, not shown, may be carried on the exterior of the shaft which would engage a switch mounted on the dock surface S. Colored signal lights, horns or buzzers, not shown, may be connected to such a switch and a suitable electrical power source and, thus, indicate whether the member 21 is in the operative or inoperative mode. The components of such a signal system are well known in the industry and the location of the signal lights, horns or buzzers should be such that they can be seen or heard by the driver of the vehicle when sitting in the operator's seat and by the personnel loading or unloading the vehicle.

If desired, the size and shape of the various components of the improved locking device may be modified from the shown without departing from the scope of the invention. Furthermore, the movement of member 21 from the inoperative mode to operative mode need not be connected to components of a dock leveler, but rather may be actuated independently either manually or by an electric, pneumatic, or hydraulic power means well known and readily available on the market.

Thus, it will be noted that an improved locking device of the type described above is provided which is simple and compact in construction; versatile and effective in operation; may be readily installed in existing or new structures; is capable of withstanding abusive treatment; and is not adversely affected by extreme climatic conditions.

I claim:

1. A device for releasably securing a parked vehicle to an adjacent structure, said device comprising a first means hingedly mounted for movement between an operative mode and an inoperative mode and adapted to normally assume an inoperative mode, said first means, when in an operative mode, having a distal portion thereof adapted to interlockingly engage the vehicle and substantially restrain movement thereof away from the adjacent structure and, when in an inoperative mode, having said distal portion assume a vehicle-release position; second means operatively connected to said first means for controlled movement thereof from an inoperative mode to an operative mode; third means for automatically locking said first means in an operative mode, said third means including an adjustable assembly for effecting controlled unlocking of said first means; and a carriage having a first section on which said first means and said third means are mounted and a second section mountable on the adjacent structure.

2. The device of claim 1 wherein the carriage sections are adjustably connected to one another and said carriage first section is biased to normally assume a predetermined first position with respect to said second section.

3. The device of claim 2 wherein the carriage first section is adjustable from said first position in a substantially vertical downward direction relative to said second section upon a predetermined external downward force being applied to said first section.

4. The device of claim 2 wherein the carriage first section includes an outwardly projecting cam segment for engagement by a portion of the vehicle when the latter is being parked at the adjacent structure.

5. The device of claim 4 wherein the cam segment includes a vehicle-engaging surface sloping upwardly towards the carriage second section; said surface being adapted to be engaged by the vehicle, while the latter is being parked at the adjacent structure, and effecting a downward force being applied to said carriage first section; upon said applied downward force being at least a predetermined amount said carriage first section will be moved downwardly relative to said second section.

6. The device of claim 5 wherein the distal portion of said first means is recessed relative to the vehicle-engaging surface of the cam segment when said first means assumes an inoperative mode, and when said first means assumes an operative mode, the distal portion of said first means protrudes beyond said surface.

7. The device of claim 1 wherein the third means includes a pair of complemental lock elements, one element disposed coaxially with the hinge axis of said first means and movable as a unit with said first means about said hinge axis, a second element disposed in aligned coaxial relation with said one element, said second element being mounted in a non-rotational relation with respect to said one element, said elements normally assuming an interlocking relation whereby said first means is restrained from moving from said operative mode towards said inoperative mode, one of said elements being movable axially in a predetermined direction relative to the other element to effect unlocking of said elements; and means operatively connected to the one of said elements to effect controlled axial movement thereof and unlocking of said elements.

8. The device of claim 7 wherein both of said complemental lock elements are mounted for independent movement axially of the other whereby axial movement in a predetermined direction of either of said elements effects unlocking of said elements.

9. The device of claim 8 wherein each complemental lock element is biased towards the other into locking relation.

10. The device of claim 7 wherein each lock element includes an end piece, said end pieces having complemental surface portions which interlockingly engage one another and prevent relative rotational movement between one another in one direction.

11. The device of claim 10 wherein the end pieces are provided with complemental end faces and said faces abut one another when said lock elements are in interlocking relation.

12. The device of claim 1 wherein the second means includes an elongated element having one end thereof attached to a portion of said first means spaced radially outwardly a substantial amount relative to the hinge axis of said first means and the other end of said elongated element being provided with means for imparting a predetermined tangential force in one direction to said first means to effect controlled rotation thereof from an inoperative mode to an operative mode.

13. The device of claim 12 wherein the elongated element is flexible adjacent said one end and at least partially encompasses the first means portion when said first means is in an inoperative mode.

14. The device of claim 2 wherein the carriage first section is slidable in a substantially vertical plane relative to said second section between an upper terminal position and a lower terminal position; said first section being biased to normally assume said upper terminal position 15. The device of claim 14 wherein the carriage first section includes a bearing segment for hingedly supporting said first means, the hinge axis of said first means being substantially horizontally disposed for all relative positions of said carriage first section with respect to said carriage second section.

* * * * *